US012763401B2

(12) United States Patent
Deng

(10) Patent No.: US 12,763,401 B2
(45) Date of Patent: Oct. 13, 2026

(54) TRACTION BATTERY PACK IMMERSION THERMAL MANAGEMENT SYSTEM WITH MULTIPLE OUTLET PORTS

(71) Applicant: Ford Global Technologies, LLC, Dearborn, MI (US)

(72) Inventor: Jie Deng, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 18/649,940

(22) Filed: Apr. 29, 2024

(65) Prior Publication Data

US 2025/0337048 A1 Oct. 30, 2025

(51) Int. Cl.

| | |
|---|---|
| ***H01M 10/6568*** | (2014.01) |
| ***B60K 11/02*** | (2006.01) |
| ***B60L 50/64*** | (2019.01) |
| ***F28F 9/02*** | (2006.01) |
| ***H01M 10/613*** | (2014.01) |
| ***H01M 10/625*** | (2014.01) |
| ***H01M 10/655*** | (2014.01) |

(Continued)

(52) U.S. Cl.

CPC ......... *H01M 10/6568* (2015.04); *B60K 11/02* (2013.01); *B60L 50/64* (2019.02); *H01M 10/613* (2015.04); *H01M 10/625* (2015.04); *H01M 10/655* (2015.04); *H01M 50/204* (2021.01); *H01M 50/249* (2021.01); *F28F 9/02* (2013.01); *H01M 2220/20* (2013.01)

(58) Field of Classification Search

CPC ......... H01M 10/6568; H01M 10/6567; H01M 10/613; H01M 10/617; H01M 10/655; H01M 50/249; H01M 50/204; F28F 9/001; F28F 9/02; F28F 9/0275; B60K 11/02; B60L 50/64

See application file for complete search history.

(56) References Cited

U.S. PATENT DOCUMENTS 9,281,547 B2 * 3/2016 Maguire ................. B60L 58/26
10,224,525 B2 * 3/2019 Karulkar ............. H01M 10/625

(Continued)

FOREIGN PATENT DOCUMENTS

CN 117393907 A 1/2024
DE 102013216513 A1 * 2/2015 .......... H01M 50/204

(Continued)

*Primary Examiner* — Jianying C Atkisson
*Assistant Examiner* — For K Ling
(74) *Attorney, Agent, or Firm* — David B. Kelley; Carlson, Gaskey & Olds, P.C.

(57) ABSTRACT

A traction battery pack immersion thermal management system includes a coolant delivery system that communicates a coolant from an coolant supply to a battery case that houses a cell stack. The coolant delivery system includes at least one inlet port to the battery. The thermal management system additionally includes a coolant return system that communicates the coolant from the battery case back to the coolant supply. The coolant return system including a plurality of outlet ports and a return manifold. The outlet ports each separately fluidly connect the battery case to the return manifold. The return manifold is configured such that coolant received from each of the plurality of outlet ports is mixed within the return manifold prior to reaching the coolant supply.

5 Claims, 3 Drawing Sheets

(51) Int. Cl.
*H01M 50/204* (2021.01)
*H01M 50/249* (2021.01)

(56) References Cited

U.S. PATENT DOCUMENTS

| | | | | |
|---|---|---|---|---|
| 2007/0026301 | A1* | 2/2007 | Lee | H01M 10/6563 429/50 |
| 2010/0285347 | A1* | 11/2010 | Saito | H01M 50/264 429/120 |
| 2013/0177786 | A1* | 7/2013 | Prochazka, Jr. | H01M 10/052 429/82 |
| 2021/0210809 | A1* | 7/2021 | Cheon | H01M 50/213 |
| 2021/0280928 | A1* | 9/2021 | Singer | H01M 10/6556 |
| 2022/0131211 | A1* | 4/2022 | Kellner | H01M 10/6567 |
| 2022/0316818 | A1* | 10/2022 | Fröhlich | F28D 1/035 |
| 2023/0315118 | A1 | 10/2023 | Hickey | |
| 2023/0318118 | A1* | 10/2023 | Hickey | B60L 3/0046 429/62 |

FOREIGN PATENT DOCUMENTS

| | | | | | |
|---|---|---|---|---|---|
| KR | 20190097634 | A | * | 8/2019 | F28F 9/0275 |
| WO | 2004036136 | A1 | | 4/2004 | |
| WO | WO-2021009632 | A1 | * | 1/2021 | H01M 10/625 |
| WO | 2021134445 | A1 | | 7/2021 | |

* cited by examiner

TRACTION BATTERY PACK IMMERSION THERMAL MANAGEMENT SYSTEM WITH MULTIPLE OUTLET PORTS

TECHNICAL FIELD

This disclosure details exemplary immersion thermal management systems having more than one outlet port from a battery case.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. As part of an immersion thermal management system, coolant can be moved through the traction battery pack to help manage thermal energy within the traction battery pack.

SUMMARY

In some aspects, the techniques described herein relate to a traction battery pack immersion thermal management system, including: a coolant delivery system that communicates a coolant from an coolant supply to a battery case that houses a cell stack, the coolant delivery system including at least one inlet port to the battery case; and a coolant return system that communicates the coolant from the battery case back to the coolant supply, the coolant return system including a plurality of outlet ports and a return manifold, the plurality of outlet ports each separately fluidly connecting the battery case to the return manifold, the return manifold configured such that coolant received from each of the plurality of outlet ports is mixed within the return manifold prior to reaching the coolant supply.

In some aspects, the techniques described herein relate to an immersion thermal management system, wherein the battery case is a battery pack enclosure assembly that houses the cell stack and at least one other cell stack.

In some aspects, the techniques described herein relate to an immersion thermal management system, wherein the battery case is a first cell stack case housing a first cell stack, and further including a battery pack enclosure assembly housing the first cell stack case and the first cell stack.

In some aspects, the techniques described herein relate to an immersion thermal management system, further including a second cell stack case housing a second cell stack, the second cell stack case and the second cell stack held within the battery pack enclosure assembly alongside the first cell stack case and the first cell stack.

In some aspects, the techniques described herein relate to an immersion thermal management system, wherein the plurality of outlet ports are disposed entirely within the battery pack enclosure assembly.

In some aspects, the techniques described herein relate to an immersion thermal management system, wherein the return manifold is at least partially within the enclosure housing.

In some aspects, the techniques described herein relate to an immersion thermal management system, wherein the battery case is a battery pack enclosure assembly that includes a tray and a cover.

In some aspects, the techniques described herein relate to an immersion thermal management system, wherein the plurality of outlet ports includes a first outlet port extending from the battery case to the return manifold and a second outlet port extending from the battery case to the return manifold separately from the first outlet port.

In some aspects, the techniques described herein relate to an immersion thermal management system, wherein the first outlet port is vertically above the second outlet port.

In some aspects, the techniques described herein relate to an immersion thermal management system, wherein the first outlet port connects to the return manifold at a vertical top side of the return manifold.

In some aspects, the techniques described herein relate to an immersion thermal management system, wherein the return manifold extends horizontally.

In some aspects, the techniques described herein relate to an immersion thermal management system, wherein the second outlet port connects to the return manifold at a horizontal side of the return manifold.

In some aspects, the techniques described herein relate to an immersion thermal management system, wherein the first outlet port is a first downturned outlet port.

In some aspects, the techniques described herein relate to an immersion thermal management system, wherein the return manifold extends along a return manifold axis, the first outlet port connecting to the return manifold at a first position, the second outlet port connecting to the return manifold at a second position that is aligned along the return manifold axis with the first position.

In some aspects, the techniques described herein relate to an immersion thermal management system, wherein the first position is ninety degrees offset from the second position about the return manifold axis.

In some aspects, the techniques described herein relate to an immersion thermal management system, wherein a diameter of the return manifold is greater than a diameter of any of the outlet ports within the plurality of outlet ports.

In some aspects, the techniques described herein relate to an immersion thermal management system, wherein the coolant is a liquid coolant.

In some aspects, the techniques described herein relate to a method of managing thermal energy levels within a traction battery pack, including: delivering a coolant from an coolant supply to a battery case that houses a cell stack; communicating some of the coolant from the battery case through a first outlet port that extends from the battery case to a return manifold; communicating some of the coolant from the battery case through a second outlet port that extends from the battery case to the return manifold; and communicating coolant from the first outlet port and coolant from the second outlet port back to the coolant supply.

In some aspects, the techniques described herein relate to a method, further including, within the return manifold, combining coolant from the first outlet port with coolant from the second outlet port, prior to the coolant from the first outlet port or the coolant from the second outlet port reaching the coolant supply.

In some aspects, the techniques described herein relate to a method, wherein the combining is within a battery pack enclosure that encloses the battery case housing the cell stack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

An immersion thermal management system can be used to manage thermal energy in a traction battery pack. The system immerses at least some components of the traction battery pack in a coolant. The immersed components can include cell stacks held within a battery case.

Figure 1:
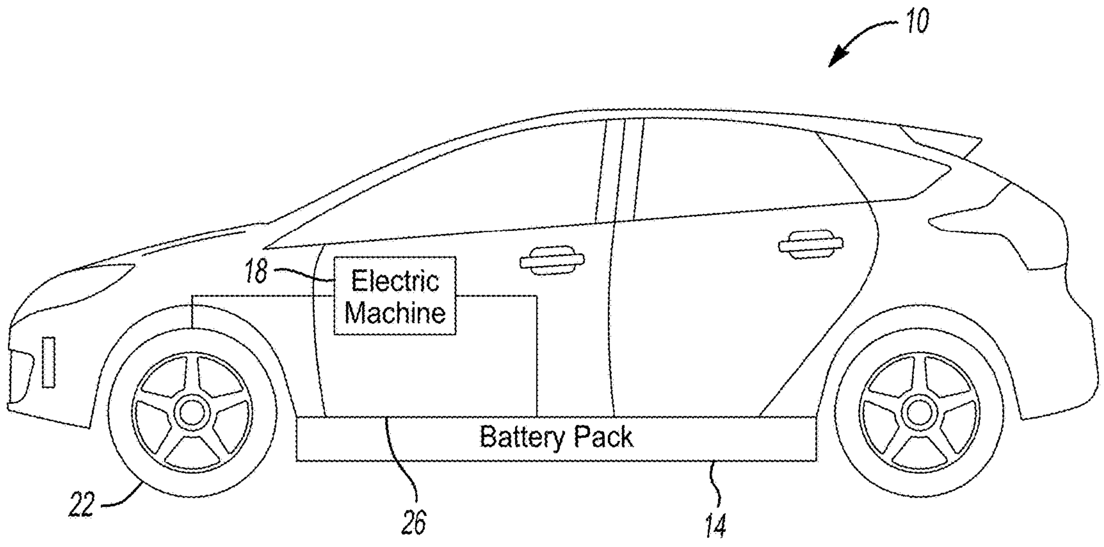
FIG. 1 illustrates a side view of an electrified vehicle having a battery pack.

With reference to FIG. 1, an electrified vehicle 10 includes a traction battery pack 14, an electric machine 18, and wheels 22. The traction battery pack 14 powers an electric machine 18, which can convert electrical power to mechanical power to drive the wheels 22. The traction battery pack 14 can be a relatively high-voltage battery.

The traction battery pack 14 is, in the exemplary embodiment, secured to an underbody 26 of the electrified vehicle 10. The traction battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

Figure 2:
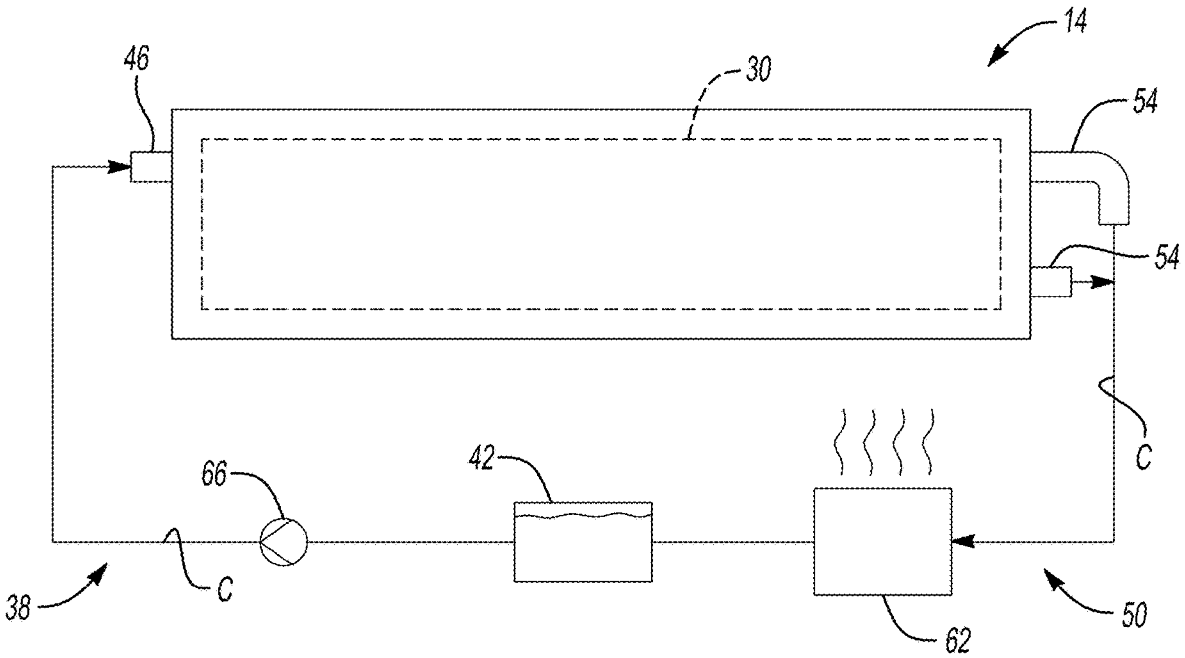
FIG. 2 illustrates a highly schematic view of the battery pack from FIG. 1 along with a schematic view of an associated immersion thermal management system according to an exemplary aspect of the present disclosure and immersion thermal management system of FIG. 2.
Figure 3:
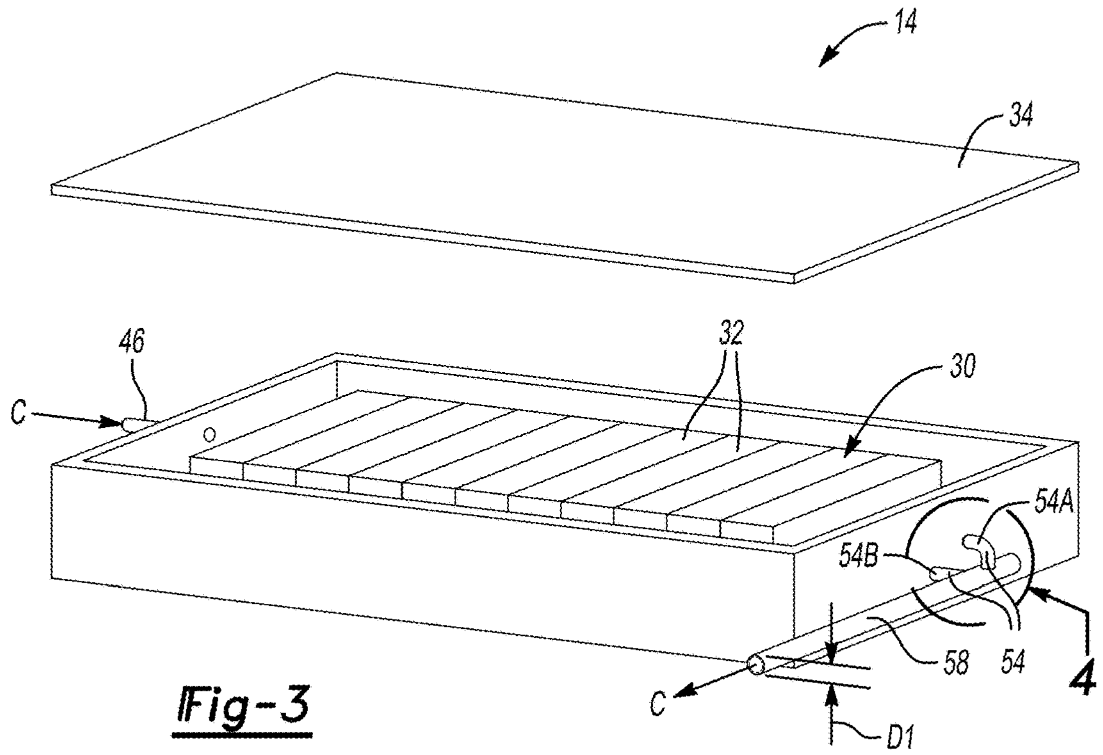
FIG. 3 illustrates a perspective and partially expanded view of the battery pack from FIG. 2.
Figure 4:
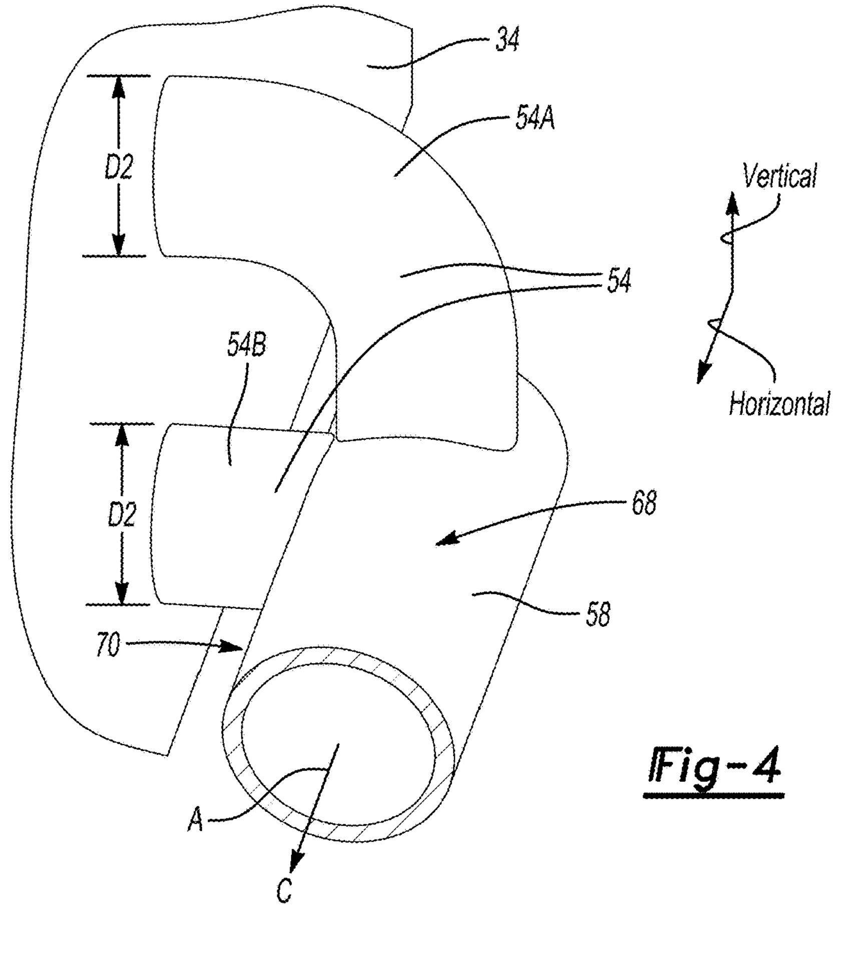
FIG. 4 illustrates a close-up view of an area of FIG. 3.

With reference now to FIGS. 2-4, an immersion thermal management system is utilized to manage thermal energy levels within the battery pack 14. In this example, the system cools the battery pack 14. Other examples could include heating the battery pack 14 using the system.

In this example, the battery pack 14 includes at least one cell stack 30 having a plurality of individual battery cells 32. The battery cells 32 can be lithium-ion pouch-style cells. However, battery cells having other geometries (cylindrical, etc.), other chemistries (nickel-metal hydride, lead-acid, etc.), or both could alternatively be utilized within the scope of this disclosure.

The cell stack 30 is housed within a cell stack case 34. The immersion thermal management system includes a coolant delivery system 38 that delivers coolant C from an coolant supply 42 to an interior of the cell stack case 34 through at least one inlet port 46.

Within the cell stack case 34, the cell stack 30 is immersed within the coolant C such that the coolant C can take on thermal energy from the cell stack 30 and surrounding components of the battery pack 14. The coolant C can be a liquid, non-conductive (i.e., dielectric) coolant C. The thermal management system is considered an immersion thermal management system at least because portions of the battery pack 14, here at least the battery cells 32 are immersed in the coolant C.

The immersion thermal management system includes a coolant return system 50 that communicates coolant C from the cell stack case 34 back to the coolant supply 42. The coolant return system 50 includes, among other things, a plurality of outlet ports 54 and a return manifold 58. The outlet ports 54 each extend separately from the cell stack case 34 to the return manifold 58. The plurality of outlet ports 54 each separately fluidly connect the cell stack case 34 to the return manifold 58.

The return manifold 58 can receives coolant C from the cell stack case 34 through each of the outlet ports 54. Coolant C received from each of the outlet ports 54 is combined within the return manifold 58. A diameter D1 of the return manifold 58 is greater than a diameter D2 of either of the outlet ports 54. In this example, the diameter D2 of the outlet ports 54 is the same. In another example, the outlet ports 54 could have different diameters.

From the return manifold 58, the coolant C is routed through a thermal exchange device 62 where thermal energy can be transferred from the coolant C, for example. The coolant C then communicates from the thermal exchange device 62 back into the coolant supply 42.

The immersion thermal management system, in this example, includes a pump 66 that communicates the coolant C through the coolant delivery system 38 from the coolant supply 42 to the cell stack case 34, and then returns coolant C to the coolant supply 42 through the coolant return system 50.

The outlet ports 54 in this example include a first outlet port 54A and a second outlet port 54B. The first outlet port 54A is vertically above the second outlet port 54B. That is, the first outlet port 54A opens to an interior of the cell stack case 34 at a position that is vertically higher than a position at which the second outlet port 54B opens to the interior of the cell stack case 34. Vertical and horizontal, for purposes of this disclosure, are with reference to ground and a general orientation of the battery pack 14 when installed within the electrified vehicle 10.

Should the battery pack 14 undergo a thermal event where one or more of the battery cells 32 within the cell stack 30 vent, the gaseous vent byproducts released from the battery cells 32 tend to rise within the coolant C held within the cell stack case 34. The first outlet port 54A, in particular, can communicate a mixture of coolant C and vent byproducts to the return manifold 58. This is due to the first outlet port 54A connecting to the cell stack case 34 at a vertically high position more in line with the gaseous vent byproducts that have risen within the coolant C.

The example first outlet port 54A extends horizontally from the cell stack case 34 and then turns downward to connect to a vertical top side 68 of the return manifold 58. Due to the downturn, the first outlet port 54A can be considered a downturned outlet port. In other example, the first outlet port 54A can connect to the return manifold 58 at other locations.

The second outlet port 54B extends horizontally directly from the cell stack case 34 to the return manifold 58 to connect to a horizontal side 70 of the return manifold 58.

The return manifold 58 extends generally along a return manifold axis A, which is a horizontal axis in this example. The first outlet port 54A and the second outlet port 54B open to the return manifold 58 at substantially the same axial position. Where the example first outlet port 54A connects to the vertical top side 68 of the return manifold 58 is approximately ninety degrees offset about the return manifold axis A from where the second outlet port 54B connects to the horizontal side 70 of the return manifold 58. The first outlet port 54A and the second outlet port 58A could be offset by other angles in other examples.

Within the return manifold 58, coolant C received from the first outlet port 54A combines with coolant C received from the second outlet port 54B. If the coolant C received from the first outlet port 54A is hotter than coolant C received from the second outlet port 54B, the coolant C received from the second outlet port 54B can lower a thermal energy level of the coolant C received from the first outlet port 54A.

The combining of the coolant C from the first outlet port 54A and the coolant C from the second outlet port 54B is at a position outside the cell stack case 34, which is a type of battery case.

Figure 5:
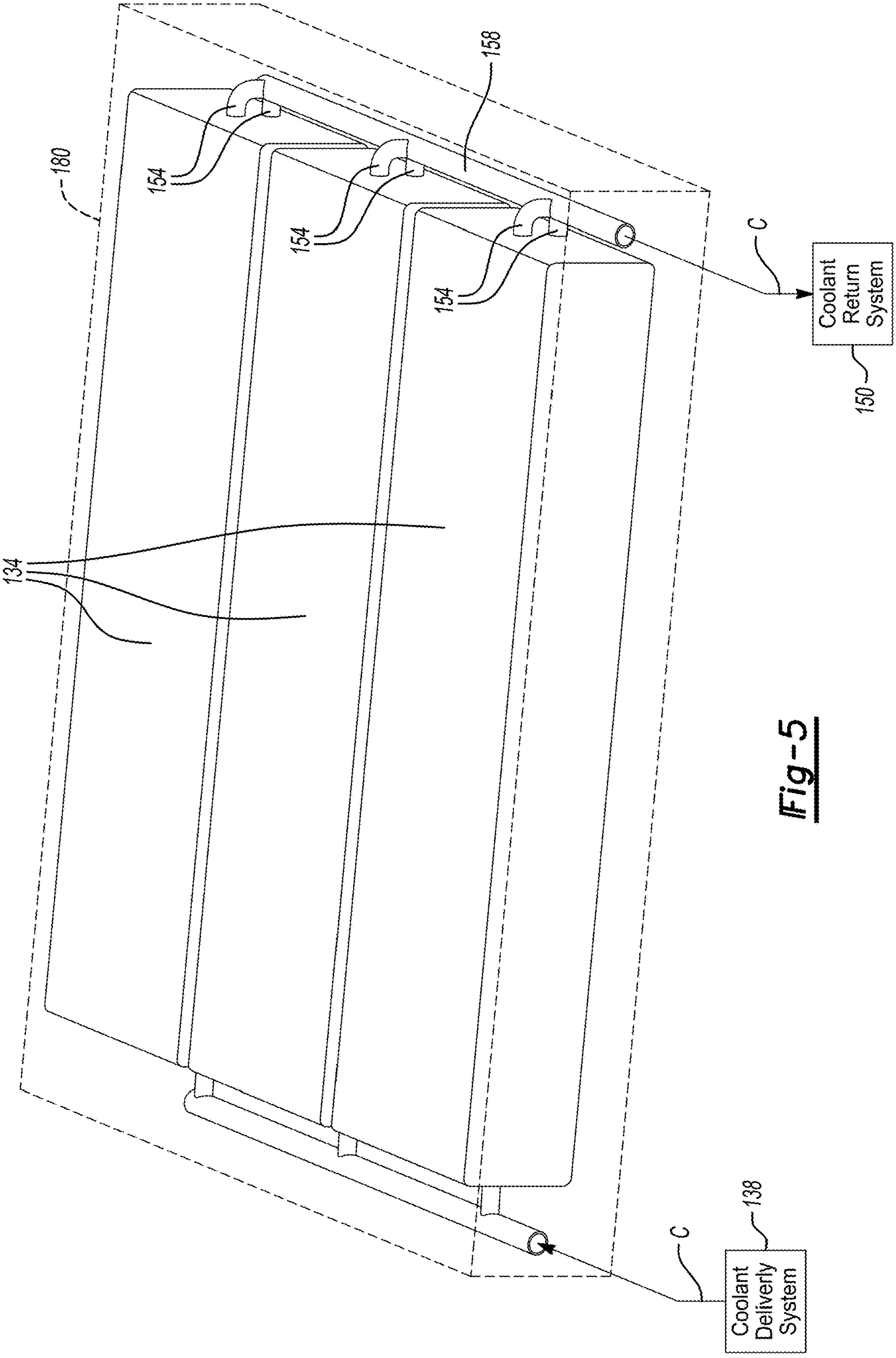
FIG. 5 illustrates a traction battery and an immersion thermal management system according to another exemplary aspect of the present disclosure.

With reference now to an alternative embodiment of FIG. 5, a plurality of cell stack cases 134 are received within another type of battery case—an enclosure assembly 180. A coolant delivery system 138 delivers coolant C to the enclosure. A coolant return system 150 receives coolant C from the enclosure. Two outlet ports 154 extend from each of the cell stack cases 134 to a return manifold 158. The outlet ports 154 are all housed entirely within the enclosure assembly 180. Combining of coolant C received from the outlet ports 154 occurs within the return manifold 158 and within the enclosure assembly 180. The return module 158 provides a singular outlet from the enclosure assembly 180.

The enclosure assembly 180, the cell stack cases 134, and the cell stack case 34 are each battery cases that can each include a cover secured to a tray via welds, for example. While welding is mentioned, the cover and tray could be connected using other fluid-tight connection techniques, such as adhesive. Further, while an exemplary battery cases are shown in the drawings, the battery cases may vary in size, shape, and configuration within the scope of this disclosure.

Features of the disclosed examples include an immersion cooling system having offset outlet ports from a battery case. The offset ports can facilitate reducing a pressure drop as coolant moves through the battery case and can facilitate removing gaseous vent byproducts from within the battery case. The offset ports can also facilitate uniform flow through the first and second ports.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack immersion thermal management system, comprising:

a coolant delivery system that communicates a coolant from a coolant supply to a battery case that houses a cell stack, the coolant delivery system including at least one inlet port to the battery case;

a battery pack enclosure assembly housing the battery case that houses the cell stack; and a coolant return system that communicates the coolant from the battery case back to the coolant supply, the coolant return system including a plurality of outlet ports and a return manifold, the plurality of outlet ports each separately fluidly connecting the battery case to the return manifold, the return manifold configured such that coolant received from each of the plurality of outlet ports is mixed within the return manifold prior to reaching the coolant supply, wherein the plurality of outlet ports are disposed entirely within the battery pack enclosure assembly, wherein the plurality of outlet ports includes a first outlet port extending from the battery case to the return manifold and a second outlet port extending from the battery case to the return manifold separately from the first outlet port, wherein the first outlet port is vertically above the second outlet port.

2. The immersion thermal management system of claim 1, wherein the battery case is a first cell stack case and the cell stack is a first cell stack, and further comprising a second cell stack case housing a second cell stack, the second cell stack case and the second cell stack held within the battery pack enclosure assembly alongside the first cell stack case and the first cell stack.

3. The immersion thermal management system of claim 1, wherein the battery pack enclosure assembly includes a tray and a cover.

4. The immersion thermal management system of claim 1, wherein a diameter of the return manifold is greater than a diameter of any of the outlet ports within the plurality of outlet ports.

5. The immersion thermal management system of claim 1, wherein the coolant is a liquid coolant.

* * * * *